(12) United States Patent
Mandal et al.

(10) Patent No.: US 11,080,864 B2
(45) Date of Patent: Aug. 3, 2021

(54) FEATURE DETECTION, SORTING, AND TRACKING IN IMAGES USING A CIRCULAR BUFFER

(71) Applicant: Intel Corporation, Santa Clara, CA (US)

(72) Inventors: Dipan Kumar Mandal, Bangalore (IN); Nagadastagiri Reddy C, Bangalore (IN); Mahesh Mamidipaka, Bangalore (IN); Om J Omer, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 15/864,029

(22) Filed: Jan. 8, 2018

(65) Prior Publication Data

US 2019/0043204 A1 Feb. 7, 2019

(51) Int. Cl.
| | |
|---|---|
| *G06T 7/20* | (2017.01) |
| *G06K 9/78* | (2006.01) |
| *G06K 9/36* | (2006.01) |
| *G06T 1/60* | (2006.01) |
| *G06T 7/246* | (2017.01) |
| *G06K 9/46* | (2006.01) |
| *G06K 9/20* | (2006.01) |
| *G06K 9/62* | (2006.01) |

(52) U.S. Cl.
CPC ............ *G06T 7/248* (2017.01); *G06K 9/2054* (2013.01); *G06K 9/36* (2013.01); *G06K 9/4642* (2013.01); *G06K 9/6201* (2013.01); *G06K 9/78* (2013.01); *G06T 1/60* (2013.01); *G06T 7/246* (2017.01)

(58) Field of Classification Search
CPC ........ G06T 7/248; G06T 7/246; G06K 9/2054
USPC ......................................... 345/557
See application file for complete search history.

(56) References Cited

U.S. PATENT DOCUMENTS

| | | | | |
|---|---|---|---|---|
| 6,091,420 A | * | 7/2000 | Horikawa | G06T 15/00 345/419 |
| 2011/0136676 A1 | * | 6/2011 | Greene | B01J 19/0046 506/4 |
| 2012/0162454 A1 | * | 6/2012 | Park | G06T 7/238 348/208.6 |
| 2012/0212481 A1 | * | 8/2012 | Zipnick | G06T 5/50 345/419 |
| 2012/0249956 A1 | * | 10/2012 | Narasimha-Iyer | A61B 3/102 351/206 |
| 2013/0128735 A1 | * | 5/2013 | Li | H04L 47/25 370/230 |
| 2014/0266803 A1 | * | 9/2014 | Bulan | G06K 9/00785 340/932.2 |

(Continued)

*Primary Examiner* — Hai Tao Sun
(74) *Attorney, Agent, or Firm* — Hanley, Flight & Zimmerman, LLC

(57) ABSTRACT

An example apparatus for tracking features in image data includes an image data receiver to receive initial image data corresponding to an image from a camera and store the image data a circular buffer. The apparatus also includes a feature detector to detect features in the image data. The apparatus further includes a feature sorter to sort the detected features to generate sorted feature points. The apparatus includes a feature tracker to track the sorted feature points in subsequent image data corresponding to the image received at the image data receiver. The subsequent image data is to replace the initial image data in the circular buffer.

22 Claims, 10 Drawing Sheets

(56) References Cited

U.S. PATENT DOCUMENTS

| | | | |
|---|---|---|---|
| 2015/0067008 A1* | 3/2015 | Kamath | G06F 17/18 |
| | | | 708/202 |
| 2015/0131848 A1* | 5/2015 | Thirumaleshwara | ........................ |
| | | | G06K 9/00624 |
| | | | 382/103 |
| 2016/0163091 A1* | 6/2016 | Wang | G06T 15/20 |
| | | | 382/103 |
| 2016/0379375 A1* | 12/2016 | Lu | G06T 7/73 |
| | | | 382/103 |
| 2018/0075593 A1* | 3/2018 | Wang | G06T 7/85 |
| 2018/0121819 A1* | 5/2018 | Manasse | G06N 20/00 |

* cited by examiner

FEATURE DETECTION, SORTING, AND TRACKING IN IMAGES USING A CIRCULAR BUFFER

BACKGROUND

Image feature detection and tracking is used in a wide variety of computer vision applications. For example, computer vision applications may include object tracking, image or video panorama, video stabilization, Structure from Motion, Visual Inertial Odometry (VIO), and Simultaneous Localization and Mapping (SLAM). In some examples, in augmented reality (AR) or virtual reality (VR) Head Mounted Displays (HMDs), a VIO or SLAM algorithm may be used to determine user head position or movement to deliver relevant augmented or virtual content correctly to a display. Image feature detection and tracking are some of the primary steps involved in detection of a user head position or a camera pose.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
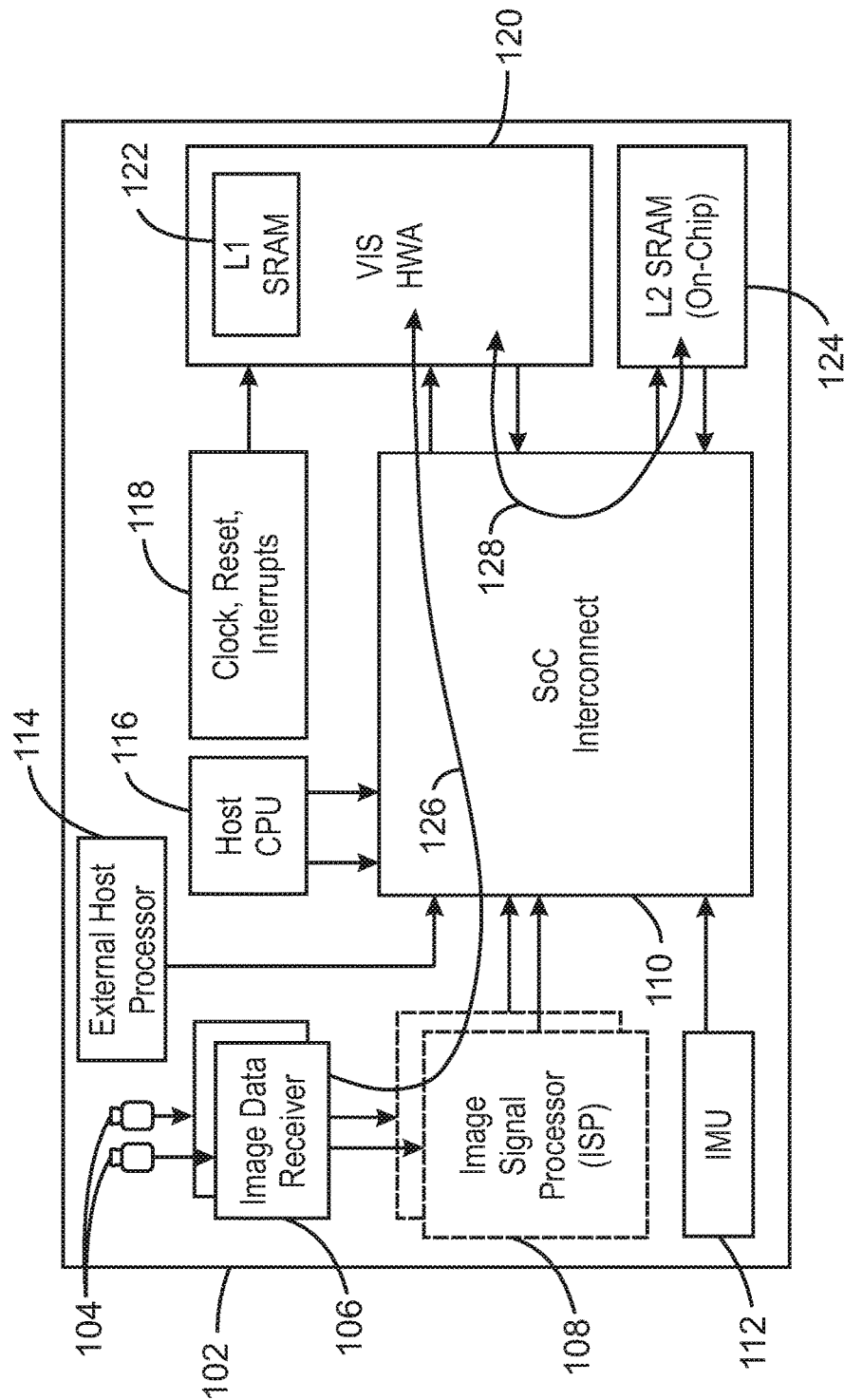
FIG. 1 is a block diagram illustrating an example system for processing features in images using a circular buffer.

As discussed above, image feature detection and tracking is used in a wide variety of computer vision applications. For example, in Visual Inertial Odometry (VIO) or Simultaneous Localization and Mapping (SLAM) systems, one or more image sensors or cameras may be used to capture a three dimensional (3D) world around a user as temporal streams of images. In some examples, the images may then be processed frame-by-frame to detect image features within each of the frames and then track the features in subsequent frames. For example, the tracked features can be used to simultaneously estimate a 3D depth of a captured scene and six degrees of freedom (6DOF) pose of the camera using multi-view geometry and Kalman filters. However, such techniques may use a large on-chip SRAM buffer to store full image frames. Thus, such approaches may be inefficient with respect to overall processing latency, silicon area spent in the system-on-chip (SoC), and the system power dissipated in on-chip SRAM or external SDRAM.

The present disclosure relates generally to techniques for detecting and tracking features in images. Specifically, the techniques described herein include an apparatus, method and system for detecting and tracking features in images using a circular buffer. As used herein, a circular buffer refers to a data structure that uses a single, fixed-size buffer as if it were connected end-to-end. For example, data may be written over previous data in the circular buffer as new data is received at the circular buffer. In some examples, the features can include corner points. Corner points, as used herein, refer to points in an image with a change in image intensity in one or more directions. An example apparatus includes an image data receiver to receive initial image data corresponding to an image from a camera and store the image data a circular buffer. The apparatus includes a feature detector to detect features in the image data. The apparatus further includes a feature sorter to sort the detected features to generate sorted feature points. The apparatus also includes a feature tracker to track the sorted feature points in subsequent image data corresponding to the image received at the image data receiver.

The techniques described herein thus enable processing, including feature detection and feature tracking, of an image frame to start in parallel with an image frame transmission. For example, the frame transmission may be over a MIPI CSIx interface. This parallel processing may result in a significant reduction of end-result-latency in detection of image features and feature tracks and consequently pose-estimate, etc. In addition, the techniques described herein enable only an N image line worth of on-chip SRAM storage to be used to process a full image frame. For example, for a high-definition 1920×1080 resolution image frame at 8 bits per pixel (BPP), with a number of image lines per image of N=32, an on-chip storage of just 60 KB can be used as opposed to a full frame storage of 2025 KB. Moreover, the techniques may enable on-the-fly selection of a predetermined number k of top feature points among all the features detected all over the image in parallel with feature detection, without requiring large on-chip storage for intermediate detected feature or their descriptors. In some examples, the techniques described herein may be used to create embedded imaging or vision processing SoCs that can reduce overall system latency of image feature detection/tracking based tasks and reduce ASIC and SoC costs by eliminating usage of large on-chip SRAM or completely eliminating need for adding external SDRAM. For example, the techniques described herein may eliminate the need for storing an incoming image in external SDRAM and subsequently fetching the entire image. In some examples, the SoCs may be used for sensor processing in augmented reality (AR)/virtual reality (VR) applications, including as 6DOF head pose estimation.

FIG. 1 is a block diagram illustrating an example system for processing features in images using a circular buffer. The example system is referred to generally by the reference number 100 and can be implemented in the computing device 900 below in FIG. 9 using the method 800 of FIG. 8 below.

The example system 100 includes a computing device 102 that is communicatively coupled to one or more cameras 104. In some examples, the cameras 104 can be integrated into the computing device 102 as shown in FIG. 1, or external to the computing device 102. The computing device 104 also include an image data receiver 106 to receive one or more images from the cameras 104. The computing device 104 includes an image signal processor (ISP) 108 communicatively coupled to the image data receiver 106. The computing device 104 further includes a system-on-chip (SoC) Interconnect 110 communicatively coupled to the ISP 108. The computing device 104 also include an inertial measurement unit (IMU) 112, an external host processor 114, and a host CPU 116, all communicatively coupled to the SoC Interconnect 110. The computing device 104 also includes a clock, reset, and interrupt module 118 that is communicatively coupled to a Visual Inertial SLAM Hardware Accelerator (VIS HWA) 120. The VIS HWA includes an L1 SRAM 122 and is communicatively coupled to the SoC Interconnect 110. The computing device 100 further also includes an L2 SRAM 124. For example, the L2 SRAM may be on-ship memory rather than off-chip memory.

As shown in FIG. 1, image data 106 corresponding to a portion of an image may be received from the one or more cameras at the ISP 108. As shown by an arrow, 126, the ISP 108 can process the image data 106 and send the processed image data to the VIS HWA 120 via the SoC Interconnect 110. For example, the ISP 108 can perform sensor color format conversion, color space conversion, and noise reduction, among other possible image processing. The VIS HWA 120 can then detect one or more features in the image data and send the image data and the detected features to the L2 SRAM via the SoC Interconnect 110 as indicated by another arrow 128. The L2 SRAM 124 may thus be used to store image data temporarily. For example, the L2 SRAM 124 may store one line of a line image at a time. In some examples, once a line of the image is processed, a subsequent line of the image may be received and written over the previous line that was stored in the L2 SRAM 124. Thus, no external or off-chip SDRAM may be used to store entire image, resulting in a more efficient design in addition to a lower latency as images can be processed in parallel or "on-the-fly" as they are received, as described in greater detail below.

The diagram of FIG. 1 is not intended to indicate that the example system 100 is to include all of the components shown in FIG. 1. Rather, the example system 100 can be implemented using fewer or additional components not illustrated in FIG. 1 (e.g., additional feature trackers, feature detectors, feature processors, data masters, memory, etc.).

Figure 2:
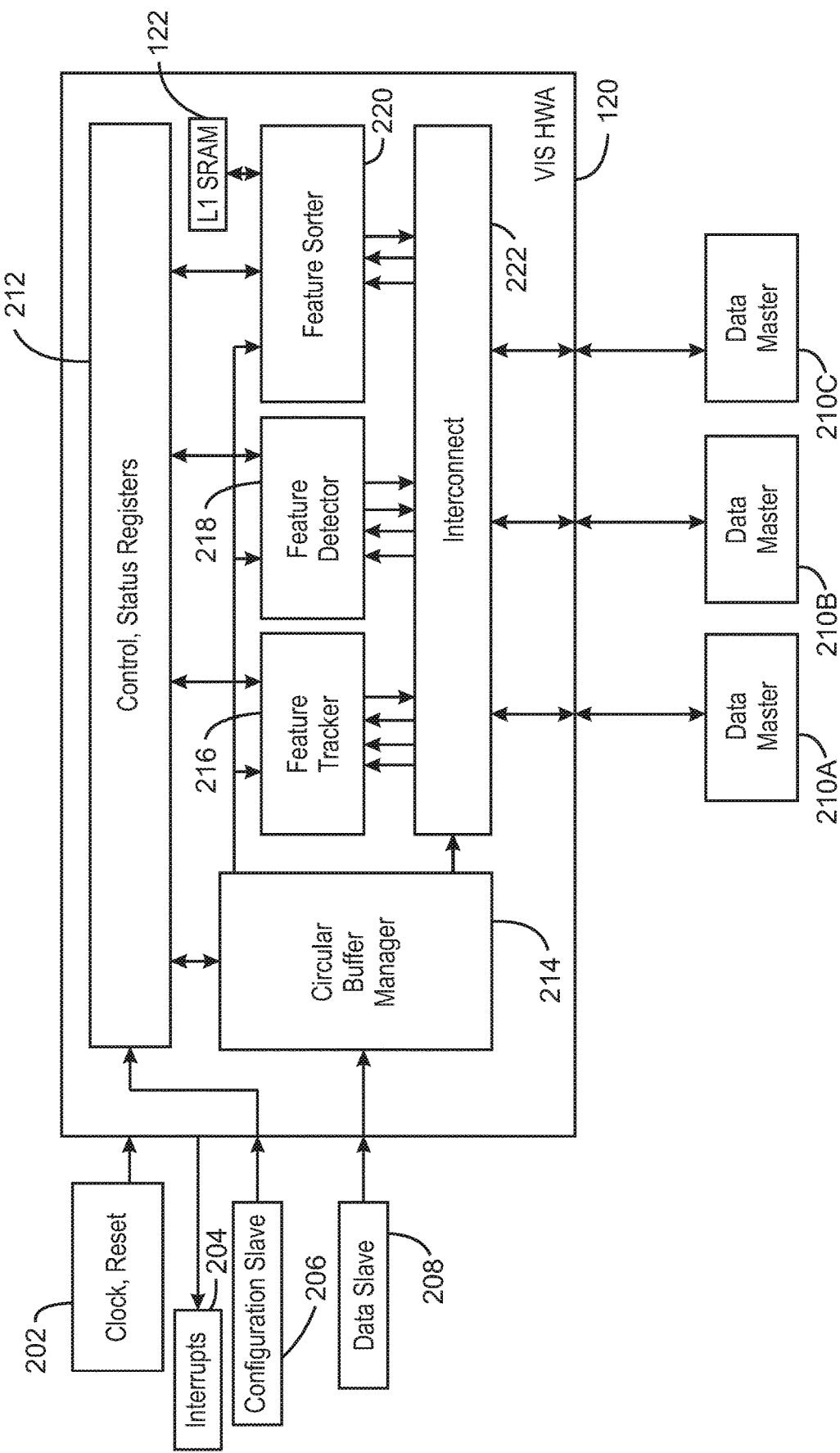
FIG. 2 is a block diagram illustrating an example apparatus for detecting, tracking, and sorting features in images using a circular buffer.

FIG. 2 is a block diagram illustrating an example apparatus for detecting, tracking, and sorting features in images using a circular buffer. The example apparatus is generally referred to by the reference number 200 and can be implemented in the system 100 above or the computing device 900 below. For example, the apparatus 200 can be implemented in the VIS HWA 120 of the system 100 of FIG. 1, the image processor 928 of the computing device 900 of FIG. 9 below, or using the computer readable media 1000 of FIG. 10 below.

FIG. 2 shows an input clock and reset data 202 into a VIS HWA 120. The VIS HWA 120 is shown outputting interrupts 204. The VIS HWA 120 is further communicatively coupled to configuration slave 206 and a data slave 208. The VIS HWA 120 is also communicatively coupled to one or more data masters, including for example, data masters 210A, 210B, and 210C. The VIS HWA 120 includes control and status registers 212 that are communicatively coupled to the configuration slave 206. The VIS HWA 120 also includes a circular buffer manager 214 that is communicatively coupled to the control and status registers 212 and the data slave 208. The VIS HWA 120 also further includes a feature tracker 216, a feature detector 218, and a feature sorter 220, that are each communicatively coupled to the control and status registers 212 and the circular buffer manager 214. The VIS HWA 120 further includes an L1 SRAM 122 communicatively coupled to the feature sorter 220. The VIS HWA 120 also further includes an Interconnect 222 communicatively coupled to the data masters (for example, data master 210A, data master 210B, data master 210C), the circular buffer manager 214, the feature tracker 216, the feature detector 218, and the feature sorter 220.

As shown in FIG. 2, the VIS HWA 120 can provide slave and master interfaces for image/data access and a programming and configuration interface to an external host CPU (not shown).

The configuration slave 206 may provide configuration data to be stored in the control and status registers. For example, the configuration slave 206 may provide configuration data via an advanced peripheral bus (APB). In some examples, the configuration data may be 32 bit format.

The circular buffer manager 214 of the VIS HWA 120 can manage storage and consumption of image data. For example, the circular buffer manager 214 can retrieve data from data slave 208 to be processed by the feature tracker 216, the feature detector 218, and the feature sorter 220. In some examples, the circular buffer manager 214 can retrieve one line of an image at a time from the data slave 208 and store the line in one or more data masters 210A, 210B, 210C. The circular buffer manager 214 can then retrieve an additional line of an image in response to detecting that the previous line has been processed. Thus, a limited amount of on-chip storage, organized as a circular buffer, can be used to provide temporary storage of streaming input image data for consumption by the feature tracker 216, the feature detector 218, and the feature sorter 220. The operation of the circular buffer manager is discussed in detail below with respect to FIGS. 3 and 4.

The feature tracker 216 can perform feature tracking. In some examples, feature tracking may include matching corresponding image features. For example, the feature tracker 216 can match image features detected by the feature detector 218 in previous image data with image features in image data currently stored in a circular buffer. In some examples, the feature tracker 216 can track sorted feature points sorted by the feature sorter 220 as described below. For example, the sorted feature points may be a subset of the image features.

The feature detector 218 can perform feature detection and descriptor computation. For example, the feature detector 218 can detect FAST9 features in image data. In FAST9 feature detection, an image pixel can be detected as a corner in response to detecting that at least 9 consecutive image pixels along a Bresenham Circle of radius 3 around it are all brighter or darker than the pixel by more than a predetermined threshold. For example, the Bresenham Circle of radius 3 may be the periphery of a 3×3 pixel grid centered on the pixel.

The feature sorter 220 can sort the detected features to generate sorted feature points. For example, the sorted feature points may be a pruned list of features. For example, the feature sorter 220 can prune detected FAST9 features based on their strength. In some examples, the feature sorter 220 can perform dynamic heap based sorting to produce sorted feature points and select a few top points to implement pruning in sync with on-the-fly feature detection, as described in greater detail with respect to FIGS. 5-7 below.

The Interconnect 222 can perform arbitration and serialization of image data and other data traffic. The Interconnect 222 can connect the feature tracker 216, the feature detector 218, and the feature sorter 220 and provide read and write interfaces. For example, the feature tracker 216 may use three read interfaces and one write interface, the feature detector may use two read and two write interfaces, and the feature sorter 220 may use two read interfaces and one write interface, and the circular buffer manager 214 may use one write interface.

The apparatus 200 may thus enable on-the-fly feature detection, tracking, and sorting. For example, the feature tracker 216, the feature detector 218, and the feature sorter 220 can use the image data in the circular buffer storage during the time the line of image data is available and finish processing the data by the time it is overwritten with additional image data.

The diagram of FIG. 2 is not intended to indicate that the example apparatus 200 is to include all of the components shown in FIG. 2. Rather, the example apparatus 200 can be implemented using fewer or additional components not illustrated in FIG. 2 (e.g., additional feature trackers, feature detectors, feature sorters, memory, data masters, etc.).

Figure 3:
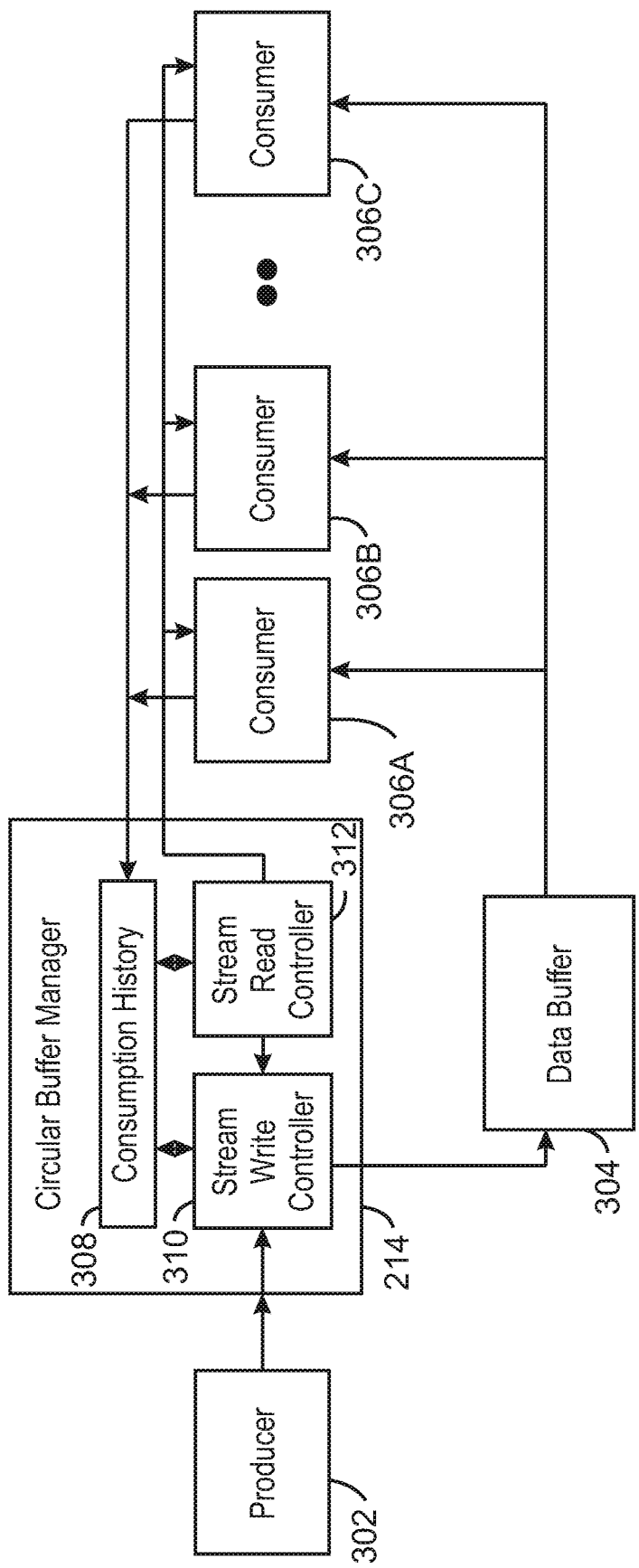
FIG. 3 is a block diagram illustrating an example apparatus including a group of data producers and consumers working using a circular buffer.

FIG. 3 is a block diagram illustrating an example apparatus including a group of data producers and consumers working using a circular buffer. The example apparatus is generally referred to by the reference number 300 and can be implemented in the computing device 900 below. For example, the apparatus 300 can be implemented in the VIS HWA 120 of the system 100 of FIG. 1, the image processor 928 of the computing device 900 of FIG. 9 below, or using the computer readable media 1000 of FIG. 10 below.

FIG. 3 shows a circular buffer manager 214 communicatively coupled to a producer 302, a data buffer 304, and a number of consumers 306A, 306B, and 306C. For example, the data buffer 304 may be a circular buffer. In some examples, as described in FIG. 4 below, the consumers 306A, 306B, 306C may be feature detectors, feature trackers or feature sorters, among other image data processors. The circular buffer manager 214 includes a consumption history 308. The circular buffer manager 214 also includes a stream write controller 310 communicatively coupled to the producer 302 and the consumption history 308. The circular buffer manager 214 further includes a stream read controller 312 communicatively coupled to the consumption history 308, the stream write controller 310 and the consumers 306A, 3068, and 306C.

As shown in FIG. 3, the circular buffer manager 214 can be used to implement a scheme for managing an input data stream of a single producer 302 and multiple consumers 306A, 306B, and 306C. In some examples, the circular buffer manager 214 can maintain a data buffer 304. For example, the data buffer 304 may be an N-Image-Line deep circular buffer of storage of incoming streaming image data. In some examples, the data buffer 304 can be used to implement a configurable N-image-line deep sliding window of an image frame. The circular buffer manager 214 can thus keep track of production and consumption rates and synchronize data buffer availability for the consumers. For example, the data buffer availability may indicate readiness of a data processing task. In some examples, the consumption rate of each of the consumers 306A, 306B, and 306C, may be both variable and different with respect to each other and that of the producer 302. Thus, the synchronization may not use a simple first-in first-out (FIFO) scheme. Rather, in some examples, the circular buffer manager 214 can employ a voting scheme using consumption rate information from each of the consumers 306A, 306B, and 306C, stored in the consumption history 308 to determine when all consumers have completed consumption of a particular data buffer entry. The circular buffer manager 214 may then cause the data buffer 304 to be populated with a subsequent image line to be processed.

The diagram of FIG. 3 is not intended to indicate that the example apparatus 300 is to include all of the components shown in FIG. 3. Rather, the example apparatus 300 can be implemented using fewer or additional components not illustrated in FIG. 3 (e.g., additional producers, consumers, data buffers, etc.).

Figure 4:
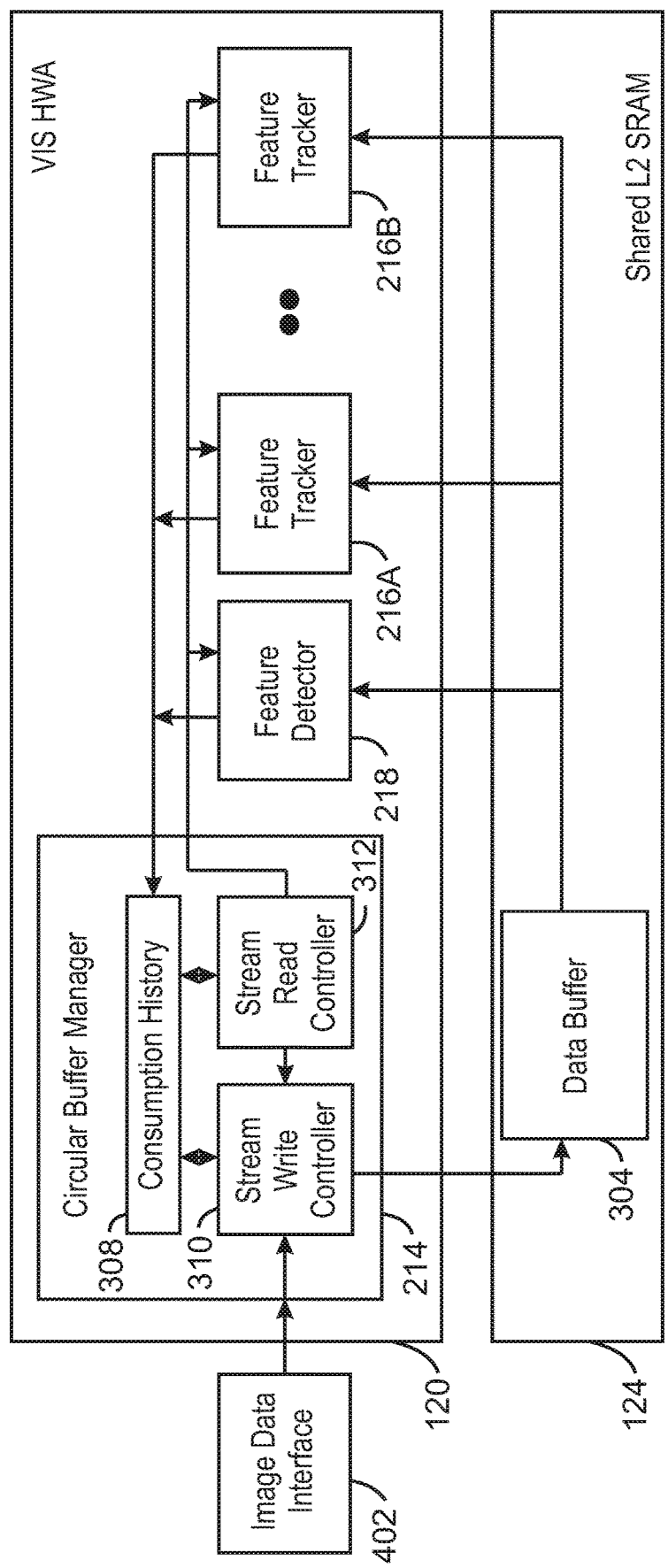
FIG. 4 is a block diagram illustrating an example implementation of an apparatus for detecting and tracking features in images using a circular buffer in a shared L2 SRAM.

FIG. 4 is a block diagram illustrating an example implementation of an apparatus for detecting and tracking features in images using a circular buffer in a shared L2 SRAM. The example apparatus is generally referred to by the reference number 400 and can be implemented in the computing device 900 below. For example, the apparatus 400 can be implemented using the VIS HWA 120 and the L2 SRAM 124 of the system 100 of FIG. 1, the image processor 928 of the computing device 900 of FIG. 9 below, or using the processor 1002 and computer readable media 1000 of FIG. 10 below.

The apparatus 400 of FIG. 4 includes similarly numbered elements from FIGS. 1, 2, and 3. In addition, the apparatus 400 includes an image data interface 402 communicatively coupled to the stream write controller 214 of the circular buffer manager 214. For example, the image processing interface may be a Mobile Industry Processing Interface (MIPI) standard compliant Camera Serial Interface (CSIx) or Image Signal Processor (ISP) Direct Memory Access (DMA). In some examples, the Image Data Interface 402 may be a MIPI CSIx interface. The stream read controller 312 of the circular buffer manager 214 is communicatively coupled to a number of consumers including a feature detector 218 and feature trackers 216A and 216B, all of which are included in a VIS HWA 120. In some examples, any number of additional feature trackers may be included. The data buffer 304 is included inside a shared L2 SRAM 124. For example, the data buffer 304 may be a circular buffer.

As shown in FIG. 4, in some examples, the circular buffer manager 214 can implement an image pixel data buffer in a shared L2 SRAM 124 and synchronize the consumption of one or more instances of the feature detector 218 and feature trackers 216A and 216B that consume and process the image pixels. In some examples, the producer of the image pixel data may be an image sensor connected via an image data interface 402. For example, the image data interface 402 may be a chip-level interface or an on-chip Image Signal Processor (ISP) DMA. An example chip-level interface is the Mobile Industry Processor Interface (MIPI) Camera Serial Interface (CSI)-2$^{SM}$ interface (version 2.0 released in March 2017) or the MIPI CSI-3$^{SM}$ (version 1.1 released in March 2014).

In some examples, the feature detector 218 can perform FAST9 feature detection. For example, an image pixel can be detected as a corner in response to detecting that at least 9 consecutive image pixels along the periphery of a Bresenham Circle of radius 3 are all brighter or darker than the pixel by more than a predetermined threshold. In some examples, the feature trackers 216A, 216B can also perform a best pixel correspondence search using Normalized Cross-Correlation (NCC) of pixel patches around candidate points for feature tracking. In some examples, the processing sequence and data access pattern of the feature detector 218 and feature trackers 216A and 216B may use a number α consecutive image lines to process β image lines. For example, α consecutive image lines of an image frame may be available to process β image lines, or β<α. In some examples, α and β can be different for each consumer. For example, each of the feature detector 218 and feature trackers 216A and 216B may use different values of α and β. As one example, the feature detector 218 may have an α value of 32 and a β value of 26. In this example, the feature trackers 216A and 216B may, for example, also have α values of 17 and 16 and β values of 1 and 10, respectively.

As mentioned in FIG. 3 above, in some examples, the circular buffer manager 214 can be configured with a depth N that is higher than the largest α value of the consumers. For example, by providing an $α_i$ number of new image lines in the data buffer 304, the circular buffer manager 214 can enable a corresponding consumer to process the next $β_i$ lines of an image. In some examples, the corresponding consumer may respond with a "processing done" indication back to the circular buffer manager 214. For example, the "processing done" message may indicate that $β_i$ number of lines has been consumed by the corresponding consumer. In some examples, the "processing done" message can be used in the circular buffer manager 214 to manage the number of unprocessed new lines of image available in the data buffer 304.

Thus, only N image lines worth of storage in the on-chip SRAM 124 may be used to process full image frame. As one example, for 1920×1080 Full HD resolution at 8 bpp, with N=32, an on-chip storage of just 60 KB may be used as opposed to a full frame storage of 2025 KB. Therefore, significant storage savings may result using a smaller, circular data buffer 204. In addition, since feature detection and feature tracking of an image frame can start in parallel with image frame transmission, this may result in a significant reduction of end-result-latency. For example, latency may be reduced for detecting image features and feature tracking, and consequently pose-estimate latency in a Visual Inertial Odometry (VIO) application, and any other latencies that rely on image feature detection or feature tracking.

The diagram of FIG. 4 is not intended to indicate that the example apparatus 400 is to include all of the components shown in FIG. 4. Rather, the example apparatus 400 can be implemented using fewer or additional components not illustrated in FIG. 4 (e.g., additional feature trackers, data buffers, memory, etc.).

Figure 5:
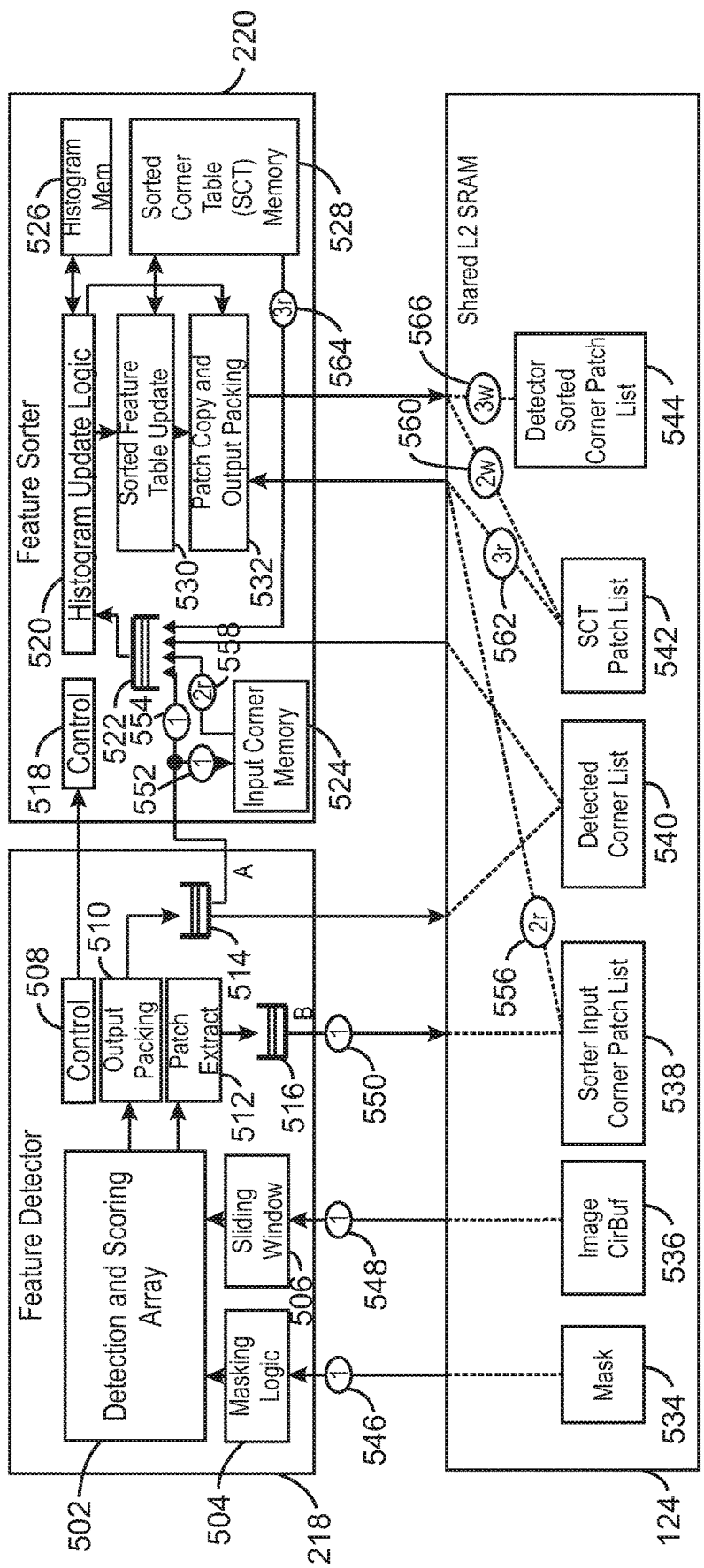
FIG. 5 is a block diagram illustrating an example system for detecting and sorting features in images using a circular buffer.

FIG. 5 is a block diagram illustrating an example system for detecting and sorting features in images using a circular buffer. The example system is generally referred to by the reference number 500 and can be implemented in the computing device 900 below. For example, the system 500 can be implemented in the system 100 of FIG. 1, the image processor 928 of the computing device 900 of FIG. 9 below, or using the processor 1002 and the computer readable media 1000 of FIG. 10 below.

The system 500 of FIG. 5 includes a feature detector 218 communicatively coupled to a feature sorter 220 and a shared L2 SRAM 124. The feature detector 218 includes a detection and scoring array 502 communicatively coupled to a masking logic 504 and a sliding window logic 506. The feature detector 218 also includes a control logic 508, an output packing logic 510, and a patch extracting logic 512, communicatively coupled to the detection and scoring array 502. The feature detector 218 also further includes an interface 516 communicatively coupled to the shared L2 SRAM 124. The feature sorter 220 includes a control logic 518 communicatively coupled to the control logic 508 of the feature detector 218. The feature sorter 220 also includes a histogram update logic 520 that is communicatively coupled to an interface 522. The interface 522 is communicatively coupled to the interface 514 of the feature detector 218 and an input corner memory 524. The feature sorter 220 also includes a histogram memory 526 that is communicatively coupled to the histogram update logic 520. The feature sorter 220 also includes a sorted corner table (SCT) memory 528 communicatively coupled to a sorted feature table update logic 530 and the interface 522. In some examples, the input corner memory 524, the histogram memory 526, and the SCT memory 528 may be implemented in an L1 SRAM, such as the L1 SRAM described above in FIGS. 1 and 2. The feature sorter 220 further includes a patch copy and output packing logic 532 that is communicatively coupled to the histogram update logic 520, the sorter feature table update logic 530, and the shared L2 SRAM 124.

The shared L2 SRAM 124 includes a stored mask 534 that can be retrieved by the masking logic 504. The shared L2 SRAM 124 also includes a circular buffer image data 536 that can be retrieved by the sliding window 506. The shared L2 SRAM 124 also includes a sorter input corner patch list 538 can be stored from the interface 516 and retrieved by the patch copy and output packing logic 532. The shared L2 SRAM 124 also further includes a detected corner list 540 that can be received from the interface 514 and retrieved by the interface 522. The shared L2 SRAM 124 also further includes a sorted corner table (SCT) patch list 542 that can be received from the patch copy and output packing logic 532 and retrieved by the patch copy and output packing logic 532. The shared L2 SRAM 124 further includes a detector sorted corner patch list 544 that may be received from the patch copy and output packing logic 532.

As shown in FIG. 5, the feature sorter 220 of system 500 can sort a batch of detected image features using a heap sort mechanism to enable a predetermined number n selected top of features to be detected. The selected predetermined number n of top sorted features are also referred to herein as sorted feature points. For example, the feature sorter 220 can process each batch of detected images features on-the-fly in parallel with feature detection by the feature detector 218 and rearrange a heap to keep a predetermined number of features and corresponding descriptors using a small shared storage. For example, the storage may be a shared L2 SRAM storage 124. In some examples, the top number of features may be selected based on a predetermined characteristic. For example, in the example of FIG. 5, the top number of features are selected based on corner strength. Corner strength, as used herein, refers to a measure of cornerness or goodness of the feature. Cornerness, as used herein, refers to a change in image intensity in one or more directions at the feature. Goodness, as used herein, refers to how good a corner is as a candidate that can be easily tracked. In some examples, the predetermined top number of features may then be used for tracking in a subsequent frame using a feature tracker (not shown). In some examples, both the number of features in a batch W and top number of features to be selected K may be configurable/programmable quantities, making it possible to select any top K number of feature points out of all detected features over the entire image. For example, the values of K and W may vary within a maximum value chosen as design-time parameter.

The feature detector 218 can detect image features on-the-fly using a circular buffer manager scheme, as described above with respect to FIGS. 2-4. For example, the masking logic 504 of the feature detector 218 may receive a mask 534 as indicated by an arrow 546. The sliding window 506 of the feature detector 218 may receive circular buffer image data 536 in which to detect one or more images features as indicated by arrow 548. For example, the detection and scoring array 502 can use the mask data 534 to detect one or more image features only within certain sub-region of the image data received at the sliding window 506.

In some examples, the feature detector 218 can stream out detected feature points to the feature sorter 220 over the interface A 514. For example, the feature points may include pixel co-ordinates (X, Y) and an integer score S. In some examples, the feature points may be streamed out from the output packing logic 510 of the of the feature detector 218 via the interface 514 to the input corner memory 524 and the interface 522 of the feature sorter, as indicated by arrows 552 and 554, respectively.

In some examples, the feature detector 218 can also write out detected feature descriptors to the Sorter Input Corner Patch List 538 memory portion in the Shared L2 SRAM 124 via the interface B 516 as indicated by an arrow 550. For example, the patch extractor 512 can extract one or more feature descriptors from the image data in the sliding window 506 and send the one or more extracted feature descriptors to the interface 516. In some examples, a feature descriptor may be an M×M pixel patch centered at a pixel coordinate (X, Y).

The feature sorter 220 can populate received detected feature points into a histogram based on their score $S_i$. For example, the histogram update logic 520 may receive the feature points via the interface 522 and store the populated histogram in histogram memory 526. For example, the histogram may contain $2^\lambda$ number of bins, where $\lambda$ is the bit-width of score S.

In some examples, the feature sorter 220 can store the incoming feature points, including pixel co-ordinates X,Y and the integer score S, into the input corner memory 524 as indicated by arrow 552. For example, the input corner memory 524 may be a local buffer in on-chip L1 SRAM.

In some examples, the feature detector 218 can trigger an intermediate sorting job on the feature sorter 220. For example, the feature detector 218 can trigger the intermediate sorting job in response to detecting that a threshold number W of detected features has been exceeded. In some examples, the control logic 508 may send a SortingStart trigger to the control logic 518 of the feature sorter 220, as described below in FIG. 6.

In response to receiving the SortingStart trigger, the feature sorter 220 can traverse down the histogram beginning from a largest-valued-bin and compute a cumulative histogram. The feature sorter 220 can then determine a bin index $\lambda_k$ that crosses K. The feature sorter 220 can then read the saved feature points from input corner memory 524 as indicated by arrow 558 and select feature points that have a score ($S_i$) falling above the bin index $\lambda_k$. The feature sorter 220 can then temporarily store the selected feature points in the SCT memory 528. For example, the SCT memory 528 may be located in an on-chip L1 SRAM.

In response to detecting that all W feature points have been read from the input corner memory 524, the feature sorter 220 can signal completion of the intermediate sorting job back to the feature detector 218. For example, the control logic 518 can send a SortingDone trigger to the control logic 508.

In some examples, the feature detector 220 can progress further to complete feature detection over the entire image. For example, the feature detector can schedule a new intermediate sorting job on the feature sorter 220 in response to detecting a threshold number W of new detected feature points is exceeded. In some examples, during an intermediate sorting job other than the first occurrence or call of the sorting process, the sorted corner table in the SCT memory 528 can also be traversed to find a corner entry that may fall below the updated $\lambda_k$ value applicable to the processing of the current batch. The sorted feature table update can evict this corner entry out of SCT memory 528 and the next new feature point from input corner memory 524 is written back in its place. For example, the next new feature point that may qualify to be above the current $\lambda_k$.

In response to detecting an end of entire frame processing, the feature detector 218 can trigger a final job of ordering the temporally stored feature points as per descending value of their scores. For example, the feature detector 218 can send an OrderingStart trigger via the control logic 508 to the control logic 518 of the feature sorter 220, as described below. In some examples, during the multiple intermediate sorting jobs, the content of the sorted corner table 524 may not be sorted with respect to any ascending or descending order of corner strength. For example, the sorted corner table 524 may just maintain the top K features/corners, which may not necessarily be in any order.

Thus, in some examples, in response to detecting the OrderingStart trigger, the feature sorter 220 can read the temporarily stored feature points in the SCT memory 528 as indicated by arrow 564, and corresponding descriptors in the SCT patch list 542 as indicated by arrow 562. In some examples, the feature sorter 220 can sort the top k feature points by traversing the latest histogram downwards from the largest-valued-bin to find a number of feature points $\delta_i$ corresponding to each bins up to the index $\lambda_k$. The feature sorter 220 can use the values $\delta_i$ to determine the address offset of the feature points having same score as the index/bin $\lambda_i$. The unordered feature points and their descriptors can be saved temporarily in the SCT memory 528 and SCT patch list 542, respectively, and can then be read sequentially and written out at the appropriate address and thereby produce an ordered list at the final result memory referred to herein as the detector sorted corner patch table memory 544 in the shared L2 SRAM 124. At the end of the ordering step, the ordered set of top K image feature points and their descriptors may thus be saved to the detector sorted corner patch list 544. For example, the feature sorter 220 can re-write the final ordered output of top K feature points in a packed format into called detector sorted corner patch list 544, as indicated by an arrow 566. For example, the packed format may include a feature descriptor followed by the feature point pixel co-ordinates (X, Y) and the score S. In some examples, the feature sorter 220 can also save of all detected feature points and their descriptors from the feature detector 218 for further processing in the host.

Thus, using the system 500, sorting may be performed on-the-fly using available detected features at the time. Therefore, the sorting process may be performed in parallel with feature detection, thus reducing latency. Moreover, a small amount of on-chip SRAM may be used since not all features and descriptors detected over entire image may need to be saved at any point in time. The use of smaller amounts of on-chip memory may result in increased efficiency in terms of both area and power cost. Moreover, the number of feature points that are to be extracted can be configurable or programmable. Thus, the system 500 can be adaptable to a particular application.

The diagram of FIG. 5 is not intended to indicate that the example system 500 is to include all of the components shown in FIG. 5. Rather, the example system 500 can be implemented using fewer or additional components not illustrated in FIG. 5 (e.g., additional shared memory, feature processing components, etc.).

Figure 6:
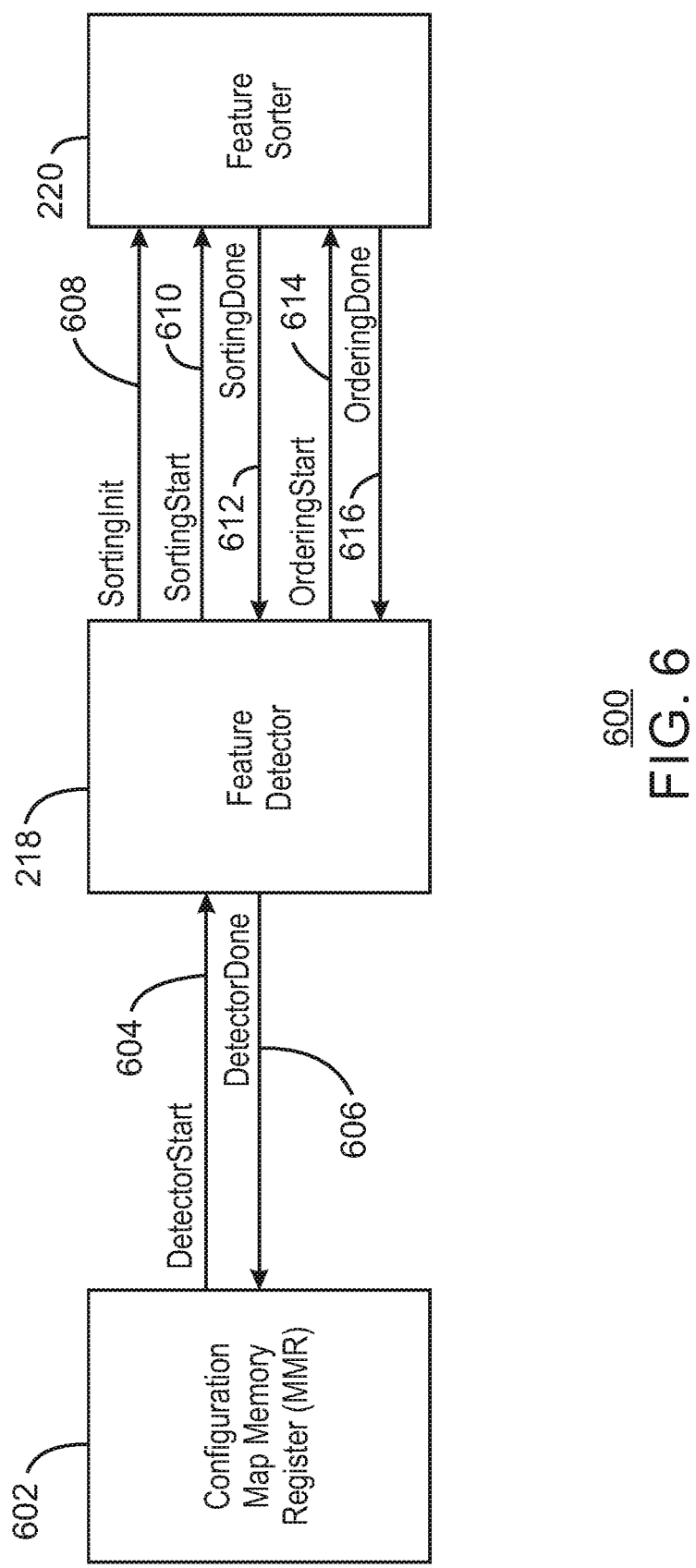
FIG. 6 is a sequence diagram illustrating a sequence of operation between an example feature detector and example feature sorter.

FIG. 6 is a sequence diagram illustrating a sequence of operation between an example feature detector and example feature sorter. The example sequence diagram is generally referred to by the reference number 600 and can be implemented in the system 500 above or the computing device 900 below.

The sequence diagram 600 includes a configuration map memory register (MMR) 602 communicatively coupled to a feature detector 218. The feature detector 218 is further also coupled to a feature sorter 220.

At arrow 604, the configuration MMR 602 sends a DetectorStart message to the feature detector 218. For example, the DetectorStart message may be used to start a feature detection operation.

At arrow 606, the configuration MMR 602 receives a DetectorDone message from the feature detector 218. For example, the feature detector 218 may perform feature detection and cause feature sorting to be performed as described below. The feature detector 218 may then send the DetectorDone message in response to detecting that the feature detection and sorting is completed.

At arrow 608, the feature detector 218 sends a SortingInit message to the feature sorter 220. For example, the SortingInit message may be sent to the feature sorter 220 to initialize a feature sorting process.

At arrow 610, the feature detector 218 sends a SortingStart message to the feature sorter 220. For example, the SortingStart message may be sent to the feature sorter 220 to start an intermediate sorting job. In some examples, the feature detector 218 may sent the SortingStart message in response to detecting that a number of features exceeds a threshold number. For example, the threshold number may be a configurable number of features.

At arrow 612, the feature sorter 220 sends a SortingDone message to the feature detector 218. For example, the feature sorter 220 may sent the Sortingdone message to the feature detector 218 in response to detecting that the intermediate sorting job has completed.

At arrow 614, the feature detector 218 sends an OrderingStart message to the feature sorter 220. For example, the feature detector 218 may send the OrderingStart message to the feature sorter 220 in response to detecting that an entire frame has been processed by intermediate sorting jobs. In some examples, the OrderingStart message may be sent by the feature detector 218 to start an ordering process at the feature sorter 220. For example, the feature sorter 220 may order the temporally stored feature points according to descending value of their scores.

At arrow 616, the feature sorter 220 sends an OrderingDone message to the feature detector 218. For example, the feature sorter 220 can send the OrderingDone message to the feature detector 218 in response to detecting that the ordering process has finished. In some examples, the ordering process may include reading temporarily stored feature points in a SCT memory 528 and corresponding feature descriptors in a SCT patch list 542 memory and re-writing the final ordered output of top K feature points into final result memory in a packed format. In some examples, the ordering process may generate an ordered set of top K image feature points and corresponding descriptors.

This process flow diagram is not intended to indicate that the blocks of the example sequence diagram 600 are to be executed in any particular order, or that all of the blocks are to be included in every case. Further, any number of additional blocks not shown may be included within the example sequence diagram 600, depending on the details of the specific implementation.

Figure 7:
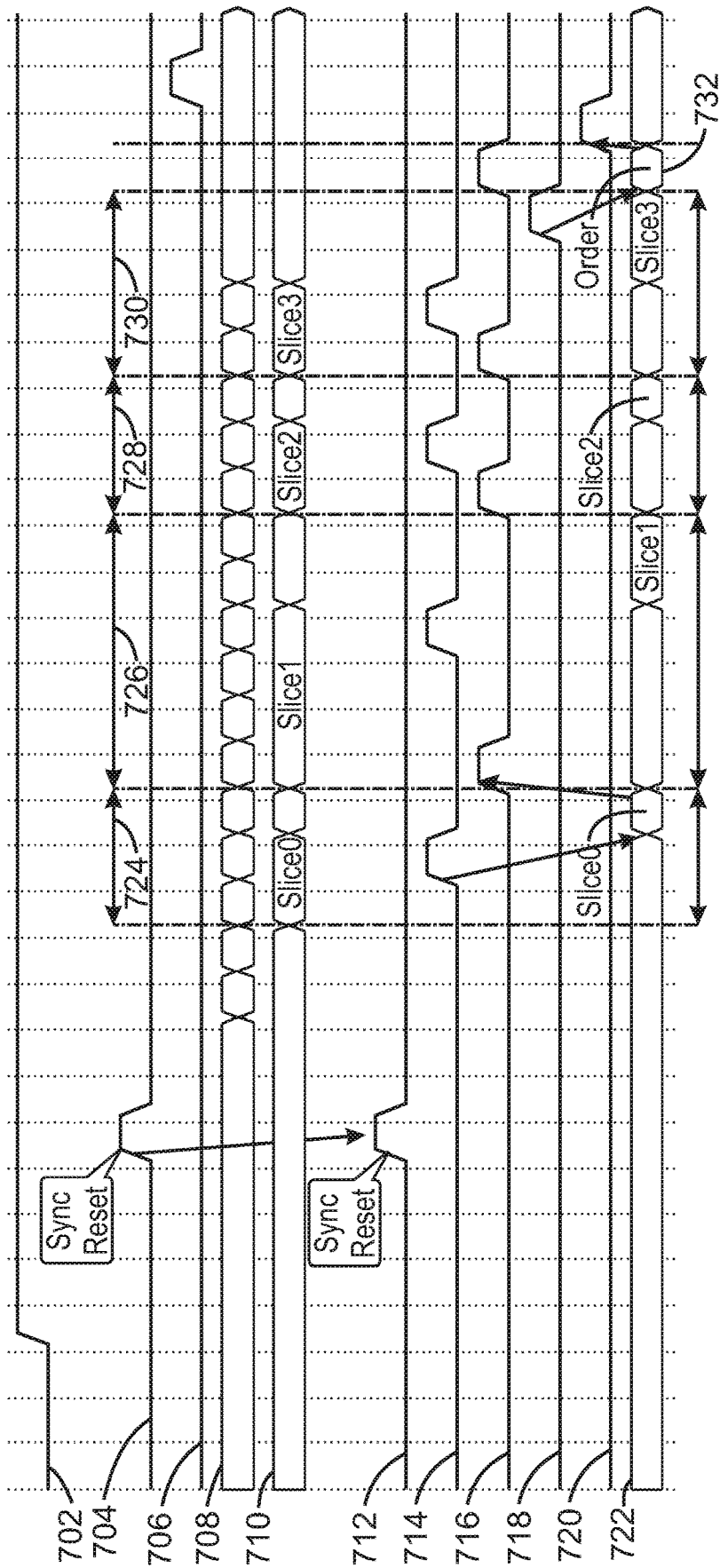
FIG. 7 is a timing diagram of an example operation between an example feature detector and example feature sorter.

FIG. 7 is timing diagram of an example operation between an example feature detector and example feature sorter. The example timing diagram is generally referred to by the reference number 700 and can be implemented in the computing device 900 below. For example, the timing diagram 700 can be used to implement the system 100 of FIG. 1 above, the image processor 928 of the computing device 900 of FIG. 9 below, or the instructions in the computer readable media 1000 of FIG. 10 below.

FIG. 7 shows a set of signals, including a reset signal 702, a DetectorStart signal 704, a DetectorDone signal 706, an InputImage signal 708, a DetectorActive signal 710, a SorterInit signal 712, a SortingStart signal 714, a SortingDone signal 716, an OrderingStart signal 718, an OrderingDone signal 720, and a SorterActive signal 722.

As shown in FIG. 7, in response to the reset signal 702 going high, a sync reset may be performed between a DetectorStart signal 704 and a SorterInit signal 712 to synchronize timing between a feature detector and a feature sorter. After the synchronization is performed between the DetectorStart signal 704 and the SorterInit signal, the feature detector may begin to receive an input image as indicated by the InputImage signal 708. At time 724, a first slice 0 may be detected by a feature detector. For example, the slice may include one or more detected image features. For example, the slice may include a W number of features. The SortingStart signal 714 may initiate a sorting process in which slice 0 may be sorted by the sorting process as shown in the second block of the SorterActive signal 722 at time 724.

At time 726, the SortingDone signal 716 may indicate that the sorting process of slice 0 is finished in response to detecting that the sorting of slice 0 is complete. In the meantime, a second slice 1 may be detected by the feature detector. The SortingStart signal 714 may then initiate another sorting process for slice 1, resulting in the sorting of slice 1 as shown in the second block of the SorterActive signal 722 at time 726.

At time 728, the SortingDone signal 716 may similarly indicate that the sorting process of slice 1 is finished in response to detecting that the sorting of slice 1 is complete. In the meantime, a third slice 2 may similarly be detected by the feature detector. The SortingStart signal 714 may then similarly initiate yet another sorting process for slice 2, resulting in the sorting of slice 2 as shown in the second block of the SorterActive signal 722 at time 728.

At time 730, the SortingDone signal 716 may again similarly indicate that the sorting process of slice 2 is finished in response to detecting that the sorting of slice 2 is complete. In the meantime, a fourth slice 3 may be detected by the feature detector. The SortingStart signal 714 may then similarly initiate a further sorting process for slice 3, resulting in the sorting of slice 3 as shown in the second block of the SorterActive signal 722 at time 730. In addition, an OrderingStart signal 718 may initiate an ordering process at the end of time 730.

At block 732, an ordering process is initiated in the SorterActive signal 722 in response to the OrderingStart signal 718. The SortingDone signal 716 may similarly indicate that the sorting process of slice 3 is finished in response to detecting that the sorting of slice 3 is complete. After the ordering process is complete, the OrderingDone signal 720 may indicate completion of the ordering process.

The DetectorDone signal 706 may then indicate detection process is complete in response to detecting the spike in the OrderingDone signal 720.

The diagram of FIG. 7 is not intended to indicate that the example timing diagram 700 is to include all of the components shown in FIG. 7. Rather, the example timing diagram 700 can be implemented using fewer or additional components not illustrated in FIG. 7 (e.g., additional signals, slices, etc.).

Figure 8:
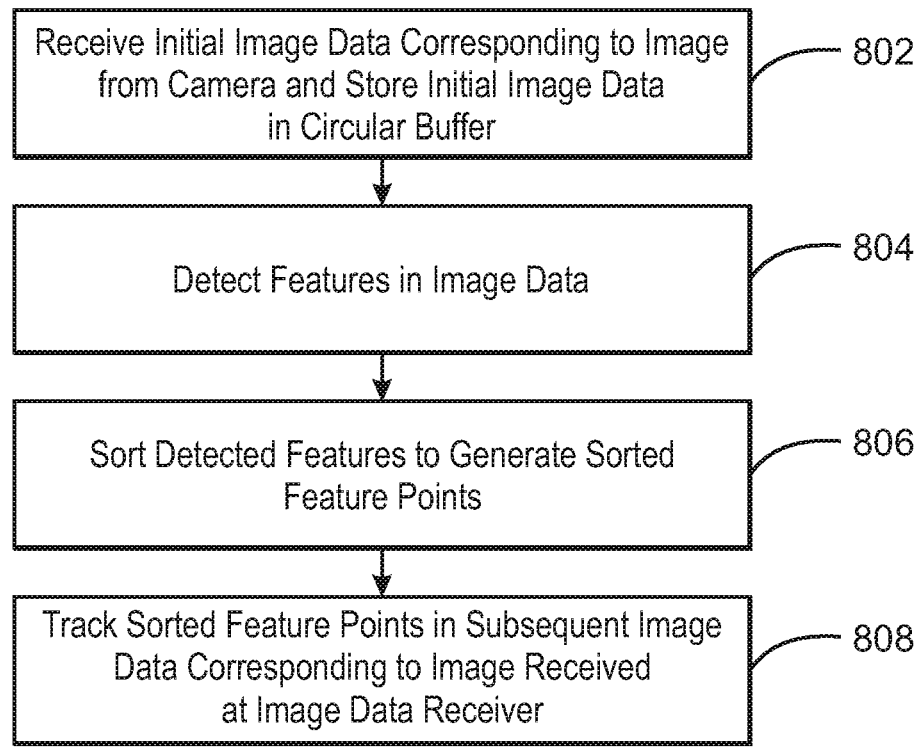
FIG. 8 is a flow chart illustrating a method for detecting and tracking features in images using a circular buffer.

FIG. 8 is a flow chart illustrating a method for detecting and tracking features in images using a circular buffer. The example method is generally referred to by the reference number 800 and can be implemented in the system 100 of FIG. 1 above, the processor 902 of the computing device 900 of FIG. 9 below, or the processor 1002 and computer readable media 1000 of FIG. 10 below.

At block 802, a processor receives initial image data corresponding to an image from a camera and store the image data a circular buffer. For example, the initial image data may be a line of an image to be processed.

At block 804, the processor detects features in the image data. For example, the processor can detect a feature in a sliding window using a mask. In some examples, the processor can detect features as described in FIGS. 4 and 5 above.

At block 806, the processor sorts the detected features to generate sorted feature points. For example, the processor can perform on-the-fly dynamic heap sorting using the circular buffer. In some examples, the processor can perform an intermediate sorting job in response to detecting that a threshold number of detected features has been exceeded. For example, the processor can populate the detected features into a histogram based on score, and storing the detected features into an input corner memory including an on-chip L1 SRAM. The processor can also traverse down a histogram populated with detected features based on score beginning from a largest-valued-bin and computing a cumulative histogram. The processor can also further pack the features into a packed format including a feature descriptor, feature point pixel co-ordinates, and an integer score. The feature descriptor can be a pixel patch centered at the feature point pixel co-ordinates. For example, the processor can perform sorting according to the example feature sorter and sorting process described in FIG. 5-7 above.

At block 808, the processor tracks the sorted feature points in subsequent image data corresponding to the image received at the image data receiver. For example, the processor can match the sorted feature points with image features detected in the subsequent image data. In some examples, the processor can write the subsequent image data over the initial image data in the circular buffer. For example, the process may begin again at block 802.

This process flow diagram is not intended to indicate that the blocks of the example process 800 are to be executed in any particular order, or that all of the blocks are to be included in every case. Further, any number of additional blocks not shown may be included within the example process 800, depending on the details of the specific implementation. In some examples, the processor may receive additional image data and the process may repeat at blocks 802-808 until all the lines of an image have been processed. Thus, the image may be completely processed line by line using blocks 802-808.

Figure 9:
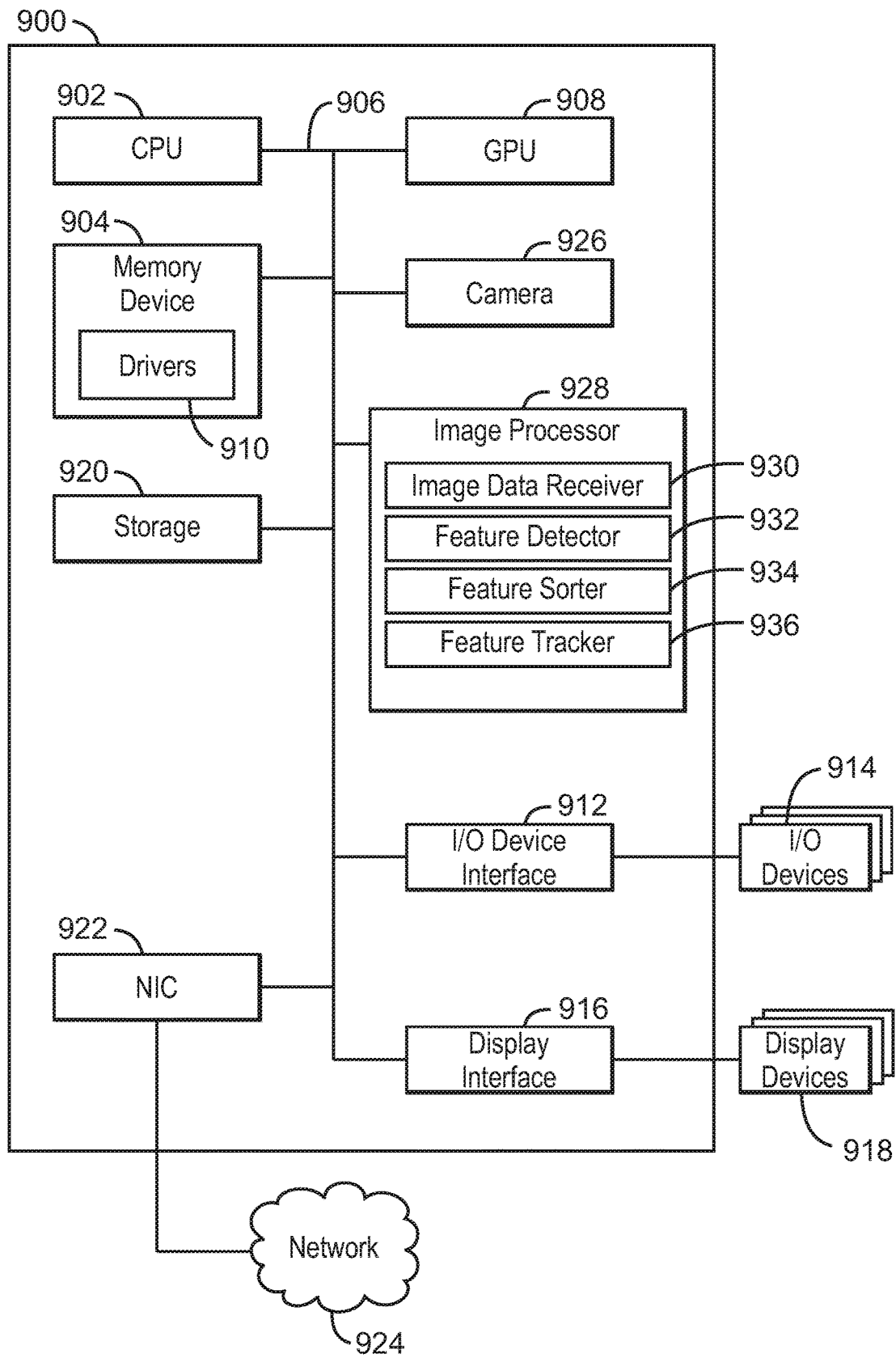
FIG. 9 is block diagram illustrating an example computing device that can detect, track, and sort features in images using a circular buffer.

Referring now to FIG. 9, a block diagram is shown illustrating an example computing device that can detect, track, and sort features in images using a circular buffer. The computing device 900 may be, for example, a laptop computer, desktop computer, tablet computer, mobile device, or wearable device, among others. In some examples, the computing device 900 may be a VIO or SLAM system. The computing device 900 may include a central processing unit (CPU) 902 that is configured to execute stored instructions, as well as a memory device 904 that stores instructions that are executable by the CPU 902. The CPU 902 may be coupled to the memory device 904 by a bus 906. Additionally, the CPU 902 can be a single core processor, a multi-core processor, a computing cluster, or any number of other configurations. Furthermore, the computing device 900 may include more than one CPU 902. In some examples, the CPU 902 may be a system-on-chip (SoC) with a multi-core processor architecture. In some examples, the CPU 902 can be a specialized digital signal processor (DSP) used for image processing. The memory device 904 can include random access memory (RAM), read only memory (ROM), flash memory, or any other suitable memory systems. For example, the memory device 904 may include dynamic random access memory (DRAM).

The memory device 904 can include random access memory (RAM), read only memory (ROM), flash memory, or any other suitable memory systems. For example, the memory device 904 may include dynamic random access memory (DRAM).

The computing device 900 may also include a graphics processing unit (GPU) 908. As shown, the CPU 902 may be coupled through the bus 906 to the GPU 908. The GPU 908 may be configured to perform any number of graphics operations within the computing device 900. For example, the GPU 908 may be configured to render or manipulate graphics images, graphics frames, videos, or the like, to be displayed to a user of the computing device 900.

The memory device 904 can include random access memory (RAM), read only memory (ROM), flash memory, or any other suitable memory systems. For example, the memory device 904 may include dynamic random access memory (DRAM). The memory device 904 may include device drivers 910 that are configured to execute the instructions for detecting, tracking, and sorting features in images using a circular buffer. The device drivers 910 may be software, an application program, application code, or the like.

The CPU 902 may also be connected through the bus 906 to an input/output (I/O) device interface 912 configured to connect the computing device 900 to one or more I/O devices 914. The I/O devices 914 may include, for example, a keyboard and a pointing device, wherein the pointing device may include a touchpad or a touchscreen, among others. The I/O devices 914 may be built-in components of the computing device 900, or may be devices that are externally connected to the computing device 900. In some examples, the memory 904 may be communicatively coupled to I/O devices 914 through direct memory access (DMA).

The CPU 902 may also be linked through the bus 906 to a display interface 916 configured to connect the computing device 900 to a display device 918. The display device 918 may include a display screen that is a built-in component of the computing device 900. The display device 918 may also include a computer monitor, television, or projector, among others, that is internal to or externally connected to the computing device 900.

The computing device 900 also includes a storage device 920. The storage device 920 is a physical memory such as a hard drive, an optical drive, a thumbdrive, an array of drives, a solid-state drive, or any combinations thereof. The storage device 920 may also include remote storage drives.

The computing device 900 may also include a network interface controller (NIC) 922. The NIC 922 may be configured to connect the computing device 900 through the bus 906 to a network 924. The network 924 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 900 further includes a depth camera 926. For example, the depth camera may include one or more depth sensors. In some example, the depth camera may include a processor to generate depth information. For example, the depth camera 926 may include functionality such as RealSense™ technology.

The computing device 900 further includes an image processor 928. For example, the image processor 928 can be used to detect, sort, and track image features in received images on-the-fly and in parallel. The image processor 928 can include an image data receiver 930, a feature detector 932, a feature sorter 934, and a feature tracker 936. In some examples, each of the components 930-936 of the image processor 928 may be a microcontroller, embedded processor, or software module. The image data receiver 930 can receive image data corresponding to an image from a camera and store the image data a circular buffer. For example, the image data may be a line of an image. In some examples, the image data receiver 930 can receive subsequent lines of an image and store each subsequent line over the previous line in the circular buffer. Thus, the image data receiver 930 can receive subsequent image data from a camera and replace the initial image data with the subsequent image data in the circular buffer. For example, the circular buffer may be an on-chip L2 static random-access memory (SRAM) that is communicatively coupled with the feature detector, the feature tracker, and the feature sorter. In some examples, the feature detector, the feature tracker, and the feature sorter are to process initial image data as described below before subsequent image data is stored in the circular buffer. The feature detector 932 can detect features in the image data. The feature sorter 934 can sort the detected features to generate sorted feature points. For example, the sorted feature points may include an ordered set of a top number of image feature points and corresponding feature descriptors. In some examples, the sorted feature points each may be formatted in a packed format and include a feature descriptor, feature point pixel co-ordinates, and an integer score. For example, the feature descriptor can include a pixel patch centered at the feature point pixel co-ordinates. In some examples, the feature sorter 934 can perform on-the-fly dynamic heap sorting using the circular buffer. The feature tracker 936 can track the sorted feature points in subsequent image data corresponding to the image received at the image data receiver. For example, the feature tracker 936 can match the detected image features with image features detected in the subsequent image data.

The block diagram of FIG. 9 is not intended to indicate that the computing device 900 is to include all of the components shown in FIG. 9. Rather, the computing device 900 can include fewer or additional components not illustrated in FIG. 9, such as additional buffers, additional processors, and the like. The computing device 900 may include any number of additional components not shown in FIG. 9, depending on the details of the specific implementation. Furthermore, any of the functionalities of the image data receiver 930, the feature detector 932, the feature sorter 934, or the feature tracker 936, may be partially, or entirely, implemented in hardware and/or in the processor 902. For example, the functionality may be implemented with an application specific integrated circuit, in logic implemented in the processor 902, or in any other device. In addition, any of the functionalities of the CPU 902 may be partially, or entirely, implemented in hardware and/or in a processor. For example, the functionality of the image processor 928 may be implemented with an application specific integrated circuit, in logic implemented in a processor, in logic implemented in a specialized graphics processing unit such as the GPU 908, or in any other device.

Figure 10:
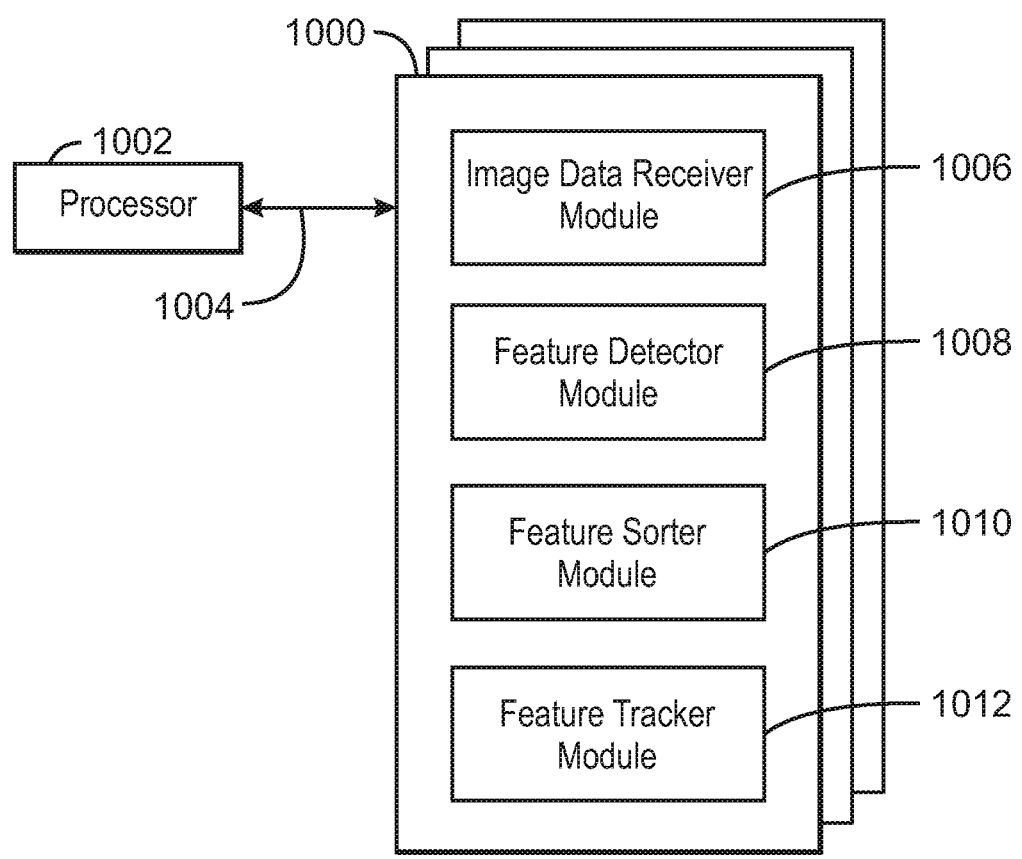
FIG. 10 is a block diagram showing computer readable media that store code for detecting, tracking, and sorting features in images using a circular buffer.

FIG. 10 is a block diagram showing computer readable media 1000 that store code for detecting, tracking, and sorting features in images using a circular buffer. The computer readable media 1000 may be accessed by a processor 1002 over a computer bus 1004. Furthermore, the computer readable medium 1000 may include code configured to direct the processor 1002 to perform the methods described herein. In some embodiments, the computer readable media 1000 may be non-transitory computer readable media. In some examples, the computer readable media 1000 may be storage media.

The various software components discussed herein may be stored on one or more computer readable media 1000, as indicated in FIG. 10. For example, an image data receiver module 1006 may be configured to receive initial image data corresponding to an image from a camera and store the image data a circular buffer. A feature detector module 1008 may be configured to detect one or more features in the image data. In some examples, the feature detector module 1008 may be configured to detect the feature in a sliding window using a mask. A feature sorter module 1010 may be configured to sort the detected features to generate sorted feature points. In some examples, the feature sorter module 1010 may be configured to perform on-the-fly dynamic heap sorting using the circular buffer. For example, the feature sorter module 1010 may be configured to perform an intermediate sorting job in response to detecting that a threshold number of detected features has been exceeded. In some examples, the feature sorter module 1010 may be configured to traverse down a histogram populated with detected features based on score beginning from a largest-valued-bin and computing a cumulative histogram. In some examples, the feature sorter module 1010 may be configured to pack the features into a packed format including a feature descriptor, feature point pixel co-ordinates, and an integer score. For example, the feature descriptor can include a pixel patch centered at the feature point pixel co-ordinates. A feature tracker module 1012 may be configured to track the sorted feature points in subsequent image data corresponding to the image received at the image data receiver. In some examples, the feature tracker module 1012 may be configured to match the detected image features with image features detected in the subsequent image data. In some examples, the subsequent image data may replace the initial image data in the circular buffer. For example, the image data receiver module 1006 may be configured to write the subsequent image data over the initial image data in the circular buffer. In some examples, the image data receiver module 1006 may be configured to process additional received image data corresponding to the image until the image is completely processed.

The block diagram of FIG. 10 is not intended to indicate that the computer readable media 1000 is to include all of the components shown in FIG. 10. Further, the computer readable media 1000 may include any number of additional components not shown in FIG. 10, depending on the details of the specific implementation.

EXAMPLES

Example 1 is an apparatus for tracking features in image data. The apparatus includes an image data receiver to receive initial image data corresponding to an image from a camera and store the image data a circular buffer. The apparatus also includes a feature detector to detect features in the image data. The apparatus further includes a feature sorter to sort the detected features to generate sorted feature points. The apparatus also further includes a feature tracker to track the sorted feature points in subsequent image data corresponding to the image received at the image data receiver.

Example 2 includes the apparatus of example 1, including or excluding optional features. In this example, the circular buffer includes an on-chip L2 static random-access memory (SRAM) that is communicatively coupled with the feature detector, the feature tracker, and the feature sorter.

Example 3 includes the apparatus of any one of examples 1 to 2, including or excluding optional features. In this example, the image data receiver is to receive the subsequent image data from a camera and replace the initial image data with the subsequent image data in the circular buffer.

Example 4 includes the apparatus of any one of examples 1 to 3, including or excluding optional features. In this example, the feature detector, the feature tracker, and the feature sorter are to process the initial image data before the subsequent image data is stored in the circular buffer.

Example 5 includes the apparatus of any one of examples 1 to 4, including or excluding optional features. In this example, the sorted feature points include an ordered set of a top number of image feature points and corresponding feature descriptors.

Example 6 includes the apparatus of any one of examples 1 to 5, including or excluding optional features. In this example, the sorted feature points each include a packed format including a feature descriptor, feature point pixel co-ordinates, and an integer score. The feature descriptor includes a pixel patch centered at the feature point pixel co-ordinates.

Example 7 includes the apparatus of any one of examples 1 to 6, including or excluding optional features. In this example, the feature sorter is to perform on-the-fly dynamic heap sorting using the circular buffer.

Example 8 includes the apparatus of any one of examples 1 to 7, including or excluding optional features. In this example, the feature tracker is to match the detected image features with image features detected in the subsequent image data.

Example 9 includes the apparatus of any one of examples 1 to 8, including or excluding optional features. In this example, the apparatus includes a circular buffer manager to maintain the circular buffer, keep track of production and consumption rates of the feature detector, the feature tracker, and the feature sorter, and synchronize data buffer availability for the feature detector, the feature tracker, and the feature sorter.

Example 10 includes the apparatus of any one of examples 1 to 9, including or excluding optional features. In this example, the initial image data and subsequent image data each include a line of the image.

Example 11 is a method for tracking features in image data. The method includes receiving, via a processor, initial image data corresponding to an image from a camera and store the image data a circular buffer. The method also includes detecting, via the processor, features in the image data. The method further includes sorting, via the processor, the detected features to generate sorted feature points. The method also further includes tracking, via the processor, the sorted feature points in subsequent image data corresponding to the image received at the image data receiver.

Example 12 includes the method of example 11, including or excluding optional features. In this example, the method includes writing the subsequent image data over the initial image data in the circular buffer.

Example 13 includes the method of any one of examples 11 to 12, including or excluding optional features. In this example, detecting the feature in the image data includes detecting the feature in a sliding window using a mask.

Example 14 includes the method of any one of examples 11 to 13, including or excluding optional features. In this example, sorting the detected features includes performing on-the-fly dynamic heap sorting using the circular buffer.

Example 15 includes the method of any one of examples 11 to 14, including or excluding optional features. In this example, tracking the detected features includes matching the detected image features with image features detected in the subsequent image data.

Example 16 includes the method of any one of examples 11 to 15, including or excluding optional features. In this example, sorting the detected features includes populating the detected features into a histogram based on score, and storing the detected features into an input corner memory including an on-chip L1 SRAM.

Example 17 includes the method of any one of examples 11 to 16, including or excluding optional features. In this example, sorting the detected features includes performing an intermediate sorting job in response to detecting that a threshold number of detected features has been exceeded.

Example 18 includes the method of any one of examples 11 to 17, including or excluding optional features. In this example, sorting the detected features includes traversing down a histogram populated with detected features based on score beginning from a largest-valued-bin and computing a cumulative histogram.

Example 19 includes the method of any one of examples 11 to 18, including or excluding optional features. In this example, sorting the detected features includes packing the features into a packed format including a feature descriptor, feature point pixel co-ordinates, and an integer score. The feature descriptor includes a pixel patch centered at the feature point pixel co-ordinates.

Example 20 includes the method of any one of examples 11 to 19, including or excluding optional features. In this example, the method includes processing additional received image data corresponding to the image until the image is completely processed.

Example 21 is at least one computer readable medium for tracking features in image data having instructions stored therein that direct the processor to receive initial image data corresponding to an image from a camera and store the image data a circular buffer. The computer-readable medium also includes instructions that direct the processor to detect one or more features in the image data. The computer-readable medium further includes instructions that direct the processor to sort the detected features to generate sorted feature points. The computer-readable medium also further includes instructions that direct the processor to track the sorted feature points in subsequent image data corresponding to the image received at the image data receiver. The subsequent image data is to replace the initial image data in the circular buffer.

Example 22 includes the computer-readable medium of example 21, including or excluding optional features. In this example, the computer-readable medium includes instructions to write the subsequent image data over the initial image data in the circular buffer.

Example 23 includes the computer-readable medium of any one of examples 21 to 22, including or excluding optional features. In this example, the computer-readable medium includes instructions to detect the feature in a sliding window using a mask.

Example 24 includes the computer-readable medium of any one of examples 21 to 23, including or excluding optional features. In this example, the computer-readable medium includes instructions to perform on-the-fly dynamic heap sorting using the circular buffer.

Example 25 includes the computer-readable medium of any one of examples 21 to 24, including or excluding optional features. In this example, the computer-readable medium includes instructions to match the detected image features with image features detected in the subsequent image data.

Example 26 includes the computer-readable medium of any one of examples 21 to 25, including or excluding optional features. In this example, the computer-readable medium includes instructions to populate the detected features into a histogram based on score, and store the detected features into an input corner memory including an on-chip L1 SRAM.

Example 27 includes the computer-readable medium of any one of examples 21 to 26, including or excluding optional features. In this example, the computer-readable medium includes instructions to perform an intermediate sorting job in response to detecting that a threshold number of detected features has been exceeded.

Example 28 includes the computer-readable medium of any one of examples 21 to 27, including or excluding optional features. In this example, the computer-readable medium includes instructions to traverse down a histogram populated with detected features based on score beginning from a largest-valued-bin and computing a cumulative histogram.

Example 29 includes the computer-readable medium of any one of examples 21 to 28, including or excluding optional features. In this example, the computer-readable medium includes instructions to pack the features into a packed format including a feature descriptor, feature point pixel co-ordinates, and an integer score. The feature descriptor includes a pixel patch centered at the feature point pixel co-ordinates.

Example 30 includes the computer-readable medium of any one of examples 21 to 29, including or excluding optional features. In this example, the computer-readable medium includes instructions to process additional received image data corresponding to the image until the image is completely processed.

Example 31 is a system for tracking features in image data. The system includes an image data receiver to receive initial image data corresponding to an image from a camera and store the image data a circular buffer. The system also includes a feature detector to detect features in the image data. The system further includes a feature sorter to sort the detected features to generate sorted feature points. The system also further includes a feature tracker to track the sorted feature points in subsequent image data corresponding to the image received at the image data receiver.

Example 32 includes the system of example 31, including or excluding optional features. In this example, the circular buffer includes an on-chip L2 static random-access memory (SRAM) that is communicatively coupled with the feature detector, the feature tracker, and the feature sorter.

Example 33 includes the system of any one of examples 31 to 32, including or excluding optional features. In this example, the image data receiver is to receive the subsequent image data from a camera and replace the initial image data with the subsequent image data in the circular buffer.

Example 34 includes the system of any one of examples 31 to 33, including or excluding optional features. In this example, the feature detector, the feature tracker, and the feature sorter are to process the initial image data before the subsequent image data is stored in the circular buffer.

Example 35 includes the system of any one of examples 31 to 34, including or excluding optional features. In this example, the sorted feature points include an ordered set of a top number of image feature points and corresponding feature descriptors.

Example 36 includes the system of any one of examples 31 to 35, including or excluding optional features. In this example, the sorted feature points each include a packed format including a feature descriptor, feature point pixel co-ordinates, and an integer score. The feature descriptor includes a pixel patch centered at the feature point pixel co-ordinates.

Example 37 includes the system of any one of examples 31 to 36, including or excluding optional features. In this example, the feature sorter is to perform on-the-fly dynamic heap sorting using the circular buffer.

Example 38 includes the system of any one of examples 31 to 37, including or excluding optional features. In this example, the feature tracker is to match the detected image features with image features detected in the subsequent image data.

Example 39 includes the system of any one of examples 31 to 38, including or excluding optional features. In this example, the system includes a circular buffer manager to maintain the circular buffer, keep track of production and consumption rates of the feature detector, the feature tracker, and the feature sorter, and synchronize data buffer availability for the feature detector, the feature tracker, and the feature sorter.

Example 40 includes the system of any one of examples 31 to 39, including or excluding optional features. In this example, the initial image data and subsequent image data each include a line of the image.

Example 41 is a system for tracking features in image data. The system includes means for receiving initial image data corresponding to an image from a camera and store the image data a circular buffer. The system also includes means for detecting features in the image data. The system further includes means for sorting the detected features to generate sorted feature points. The system also further includes means for tracking the sorted feature points in subsequent image data corresponding to the image received at the image data receiver.

Example 42 includes the system of example 41, including or excluding optional features. In this example, the circular buffer includes an on-chip L2 static random-access memory (SRAM) that is communicatively coupled with the means for detecting the feature, the means for sorting the detected features, and the means for tracking the sorted feature points.

Example 43 includes the system of any one of examples 41 to 42, including or excluding optional features. In this example, the means for receiving the initial image data is to receive the subsequent image data from a camera and replace the initial image data with the subsequent image data in the circular buffer.

Example 44 includes the system of any one of examples 41 to 43, including or excluding optional features. In this example, the means for detecting the features, the means for sorting the detected features, and the means for tracking the sorted feature points are to process the initial image data before the subsequent image data is stored in the circular buffer.

Example 45 includes the system of any one of examples 41 to 44, including or excluding optional features. In this example, the sorted feature points include an ordered set of a top number of image feature points and corresponding feature descriptors.

Example 46 includes the system of any one of examples 41 to 45, including or excluding optional features. In this example, the sorted feature points each include a packed format including a feature descriptor, feature point pixel co-ordinates, and an integer score. The feature descriptor includes a pixel patch centered at the feature point pixel co-ordinates.

Example 47 includes the system of any one of examples 41 to 46, including or excluding optional features. In this example, the means for sorting the detected features is to perform on-the-fly dynamic heap sorting using the circular buffer.

Example 48 includes the system of any one of examples 41 to 47, including or excluding optional features. In this example, the means for tracking the sorted feature points is to match the detected image features with image features detected in the subsequent image data.

Example 49 includes the system of any one of examples 41 to 48, including or excluding optional features. In this example, the system includes means for maintaining the circular buffer and keeping track of production and consumption rates of the means for detecting the features, the means for tracking the sorted feature points, and the means for sorting the detected features, and synchronize data buffer availability for the means for detecting the features, the means for tracking the sorted feature points, and the means for sorting the detected features.

Example 50 includes the system of any one of examples 41 to 49, including or excluding optional features. In this example, the initial image data and subsequent image data each include a line of the image.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus to track features in image data, the apparatus comprising:
   an image data receiver to:
      receive a first line of pixels of an image from a camera; and
      store the first line of pixels in a circular buffer, the circular buffer to store a first number of lines of pixels of the image, the first number of lines to be fewer than a total number of lines of pixels of the image, the image data receiver to store a subsequent second line of pixels of the image over the first line of pixels of the image in the circular buffer at a later time;
   a feature detector to detect features in a first group of lines of pixels of the image from the circular buffer, the first group including the first line of pixels of the image;
   a feature sorter to sort the detected features to generate sorted feature points; and
   a feature tracker to track the sorted feature points in a second group of lines of pixels of the image, the second group including the subsequent second line of pixels of the image received at the image data receiver.

2. The apparatus of claim 1, wherein the circular buffer is implemented with an on-chip L2 static random-access memory (SRAM) that is communicatively coupled with the feature detector, the feature tracker, and the feature sorter.

3. The apparatus of claim 1, wherein the feature detector, the feature tracker, and the feature sorter are to process the first line of pixels of the image before the subsequent second line of pixels of the image is stored in the circular buffer.

4. The apparatus of claim 1, wherein the sorted feature points comprise include an ordered set of a selected number of the detected features with corresponding feature descriptors.

5. The apparatus of claim 1, wherein the feature sorter is to format a first one of the sorted feature points into a packed format including a feature descriptor, feature point pixel co-ordinates, and an integer score, the feature descriptor including a pixel patch centered at the feature point pixel co-ordinates.

6. The apparatus of claim 1, wherein the feature sorter is to perform an on-the-fly dynamic heap sort using the circular buffer.

7. The apparatus of claim 1, wherein the detected features are first detected features, and the feature tracker is to match the first detected features with second features detected in the second group of lines of pixels of the image.

8. The apparatus of claim 1, first including a circular buffer manager to:
   maintain the circular buffer;
   track production and consumption rates of the feature detector, the feature tracker, and the feature sorter; and
   synchronize data buffer availability for the feature detector, the feature tracker, and the feature sorter.

9. A method for tracking features in image data, comprising:
   obtaining, by executing an instruction with at least one processor, a first line of pixels of an image from a camera;
   storing the first line of pixels in a circular buffer, the circular buffer to store a first number of lines of pixels of the image, the first number of lines to be fewer than a total number of lines of pixels of the image, a subsequent second line of pixels of the image to be stored over the first line of pixels in the circular buffer at a later time;
   detecting, by executing an instruction with the at least one processor, features in a first group of lines of pixels of the image from the circular buffer, the first group including the first line of pixels of the image;
   sorting, by executing an instruction with the at least one processor, the detected features to generate sorted feature points; and
   tracking, by executing an instruction with the at least one processor, the sorted feature points in a second group of lines of pixels of the image, the second group including the subsequent second line of pixels of the image.

10. The method of claim 9, wherein the sorting of the detected features includes performing on-the-fly dynamic heap sorting using the circular buffer.

11. The method of claim 9, wherein the detected features are first detected features, and the tracking of the detected features includes matching the first detected features with second features detected in the second group of lines of pixels of the image.

12. The method of claim 9, wherein the sorting of the detected features includes:
   populating the detected features into a histogram based on score; and
   storing the detected features into an input corner memory implemented with an on-chip L1 SRAM.

13. The method of claim 9, wherein the sorting of the detected features includes performing an intermediate sorting job in response to detecting that a threshold number of detected features has been exceeded.

14. The method of claim 9, wherein the sorting of the detected features includes:
   traversing a histogram populated with the detected features based on score, the traversing beginning from a largest-valued-bin; and
   computing a cumulative histogram.

15. The method of claim 9, wherein the sorting of the detected features includes packing the features into a packed format, the packed format including a feature descriptor, feature point pixel co-ordinates, and an integer score, the feature descriptor including a pixel patch centered at the feature point pixel co-ordinates.

16. The method of claim 9, further including processing additional lines of image data corresponding to the image until the image is completely processed.

17. At least one computer readable storage device comprising computer readable instructions that, when executed, cause a computing device to at least:
   obtain a first line of pixels of an image from a camera;
   store the first line of pixels in a circular buffer, the circular buffer to store a first number of lines of pixels of the image, the first number of lines to be fewer than a total number of lines of pixels of the image;
   detect one or more features in a first group of lines of pixels of the image from the circular buffer, the first group including the first line of pixels of the image;
   sort the detected features to generate sorted feature points;
   replace the first line of pixels of the image in the circular buffer with a subsequent second line of pixels of the image; and
   track the sorted feature points in a second group of lines of pixels of the image, the second group including the subsequent second line of pixels of the image.

18. The at least one computer readable storage device of claim 17, wherein the instructions cause the computing device to perform an on-the-fly dynamic heap sort using the circular buffer.

19. The at least one computer readable storage device of claim 17, wherein the detected features are first detected features, and the instructions cause the computing device to match the first detected features with second features detected in the second group of lines of pixels of the image.

20. The apparatus of claim 1, wherein the feature sorter is to trigger an intermediate sorting job in response to a determination that a threshold number of detected features has been exceeded.

21. The apparatus of claim 1, wherein the feature sorter is to prune the sorted feature points to a second number of feature points.

22. The apparatus of claim 1, wherein the feature detector is to detect the features and the feature tracker is to track the sorted feature points of the image in parallel with reception of at least a portion of the image at the image data receiver.

* * * * *